United States Patent
Palmer et al.

(10) Patent No.: US 10,674,080 B2
(45) Date of Patent: Jun. 2, 2020

(54) WIRELESS BATTERY-LESS MINI CAMERA AND SYSTEM FOR INTERIOR INSPECTION OF CLOSED SPACES

(71) Applicant: Sikorsky Aircraft Corporation, Stratford, CT (US)

(72) Inventors: Carl A. Palmer, Pittsford, NY (US); Ronald Moffatt, Rochester, NY (US); Cody M. Ture, Fairport, NY (US); Craig D. Reed, Rochester, NY (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/651,567

(22) Filed: Jul. 17, 2017

(65) Prior Publication Data

US 2018/0027183 A1    Jan. 25, 2018

Related U.S. Application Data

(60) Provisional application No. 62/364,552, filed on Jul. 20, 2016.

(51) Int. Cl.

| | | |
|---|---|---|
| *H04N 5/225* | (2006.01) | |
| *H04N 5/232* | (2006.01) | |
| *H04N 5/247* | (2006.01) | |
| *G03B 15/03* | (2006.01) | |
| *B64D 47/08* | (2006.01) | |
| *B64F 5/60* | (2017.01) | |
| *G03B 17/02* | (2006.01) | |

(Continued)

(52) U.S. Cl.
CPC ......... *H04N 5/23241* (2013.01); *B64D 47/08* (2013.01); *B64F 5/60* (2017.01); *G03B 15/03* (2013.01); *G03B 17/02* (2013.01); *G03B 17/38* (2013.01); *H04N 5/2256* (2013.01); *H04N 5/2257* (2013.01); *H04N 5/247* (2013.01); *B64C 27/06* (2013.01); *G03B 15/006* (2013.01); *G03B 15/05* (2013.01); *G03B 2206/00* (2013.01); *G03B 2217/007* (2013.01)

(58) Field of Classification Search
CPC .............. G08B 13/1965; G08B 17/125; H04N 2005/2255; F27D 2021/026; G21C 17/08
See application file for complete search history.

(56) References Cited

U.S. PATENT DOCUMENTS

| | | |
|---|---|---|
| 8,692,905 B2 | 4/2014 | Ikeda et al. |
| 9,165,231 B2 | 10/2015 | Hull et al. |

(Continued)

FOREIGN PATENT DOCUMENTS

WO    2015175436 A1    11/2015

OTHER PUBLICATIONS

Naderiparizi, et al., "WISPCann: A Battery-Free RFID Camera," 2015 IEEE International Conference on RFID, Apr. 15-17, 2015 (Year: 2015).*

(Continued)

*Primary Examiner* — Twyler L Haskins
*Assistant Examiner* — Dwight Alex C Tejano
(74) *Attorney, Agent, or Firm* — Cantor Colburn LLP

(57) ABSTRACT

An integrated inspection system including at least one surface defining an enclosed space, at least one camera mounted in the enclosed space, and an interrogator device operatively coupled to the at least one camera. The interrogator device provides power to and receives images from the camera.

14 Claims, 4 Drawing Sheets

(51) Int. Cl.
*G03B 17/38* (2006.01)
*G03B 15/00* (2006.01)
*B64C 27/06* (2006.01)
*G03B 15/05* (2006.01)

(56) References Cited

U.S. PATENT DOCUMENTS

| | | | | |
|---|---|---|---|---|
| 2002/0050932 A1* | 5/2002 | Rhoades | ............ | G08B 13/1965 340/870.16 |
| 2002/0093564 A1* | 7/2002 | Israel | ................ | H04N 7/106 348/145 |
| 2004/0176887 A1* | 9/2004 | Kent | ................ | G05B 23/0221 701/29.5 |
| 2005/0270150 A1* | 12/2005 | Freiling | ............ | B64D 45/0015 340/521 |
| 2006/0043303 A1* | 3/2006 | Safai | ................ | G01N 21/9515 250/347 |
| 2006/0159164 A1* | 7/2006 | Finizio | ............... | B64D 45/0015 375/240.01 |
| 2009/0309762 A1* | 12/2009 | Wolcken | ................ | B64D 45/00 340/945 |
| 2011/0222754 A1* | 9/2011 | Zhao | .................... | G06T 7/0004 382/141 |
| 2011/0262026 A1* | 10/2011 | Hori | ..................... | G01M 13/00 382/141 |
| 2013/0261876 A1* | 10/2013 | Froom | ................. | B64F 5/0045 701/29.3 |
| 2014/0022380 A1* | 1/2014 | Nissen | ..................... | H04N 5/33 348/125 |
| 2014/0132804 A1* | 5/2014 | Guissin | .................. | G02B 13/06 348/239 |
| 2015/0086083 A1 | 3/2015 | Chaudhry et al. | | |
| 2015/0369751 A1* | 12/2015 | Cheim | ............... | G01N 21/8851 702/40 |
| 2016/0142596 A1* | 5/2016 | DePaschoal | ......... | H04N 5/2258 348/38 |
| 2016/0255309 A1* | 9/2016 | Hopkins | ............... | G06T 7/0004 348/82 |
| 2017/0036600 A1* | 2/2017 | Whitehead | ................ | B60R 1/00 |
| 2017/0133135 A1* | 5/2017 | Hegenbart | ............. | G01N 21/88 |
| 2017/0227457 A1* | 8/2017 | Zakrzewski | ........... | B64B 13/06 |
| 2018/0031488 A1* | 2/2018 | Waldie | ............... | G01N 21/9515 |

OTHER PUBLICATIONS

Naderiparizi, et al., "WISPCam: A Battery-Free RFID Camera," 2015 IEEE International Conference on RFID, Apr. 15-17, 2015 (Year: 2015).*

Naderiparizi, et al.; "Self-Localizing Battery-Free Cameras"; Sep. 2015; DOI: 10.1145/2750858.2805846; 2015 ACM International Joint Conference; 5 pages.

Naderiparizi, et al.; "WISPCAM: A Battery-Free RFID Camera"; May 2015; 8 pages.

* cited by examiner

WIRELESS BATTERY-LESS MINI CAMERA AND SYSTEM FOR INTERIOR INSPECTION OF CLOSED SPACES

CROSS REFERENCE TO RELATED APPLICATIONS

This application claims priority to U.S. Provisional Patent Application Ser. No. 62/364,552, filed on Jul. 20, 2016. The contents of U.S. Patent Application Ser. No. 62/364,552, are incorporated herein in their entirety by reference.

BACKGROUND

Exemplary embodiments pertain to the art of inspection systems, and more particularly, to a wireless, battery-less camera for inspecting enclosed spaces.

Various systems include difficult to access and/or enclosed spaces that require periodic visual inspection. Inspecting these enclosed spaces often involves a complex process of removing structure to provide access to personnel. In aircraft, opening a sealed access panel may require removal of rivets, sealing mechanisms and the like. Closing the sealed access panel may require the use of various tools including fastener applicators, welding devices, sealing mechanisms and the like. Thus, the opening and closing of a sealed access panel could lead to structural fatigue, damage and or loss of seal integrity.

BRIEF DESCRIPTION

Disclosed is an integrated inspection system including at least one surface defining an enclosed space, at least one camera mounted in the enclosed space, and an interrogator device operatively coupled to the at least one camera. The interrogator device provides power to and receives images from the camera.

In addition to one or more of the features described above or below, or as an alternative, further embodiments could include wherein the at least one camera includes an energy storage device.

In addition to one or more of the features described above or below, or as an alternative, further embodiments could include wherein the energy storage device comprises a capacitor.

In addition to one or more of the features described above or below, or as an alternative, further embodiments could include wherein the interrogator device includes a charging controller operable to wirelessly charge the energy storage device.

In addition to one or more of the features described above or below, or as an alternative, further embodiments could include wherein the at least one camera includes a memory device and the interrogator device includes a memory unit.

In addition to one or more of the features described above or below, or as an alternative, further embodiments could include wherein interrogator device includes a transfer controller operable to wirelessly transfer images from the memory device to the memory unit of the interrogator device.

In addition to one or more of the features described above or below, or as an alternative, further embodiments could include wherein the at least one camera includes a communication port mounted to the surface and exposed outside the enclosed space, the interrogator device being selectively connectable to the camera through the communication port.

In addition to one or more of the features described above or below, or as an alternative, further embodiments could include wherein the at least one camera includes at least one flash device.

In addition to one or more of the features described above or below, or as an alternative, further embodiments could include wherein the camera includes a first face and a second face extending at an angle relative to the first face, the first face including at least one first lens and the second face including at least one second lens, the camera being operable to capture a first image of the enclosed space through the at least one first lens and a second image of the enclosed space through the at least one second lens.

In addition to one or more of the features described above or below, or as an alternative, further embodiments could include wherein the first face could include at least one first flash device and the second face includes at least one second flash device.

In addition to one or more of the features described above or below, or as an alternative, further embodiments could include wherein the at least one camera includes a first camera and a second camera operatively connected to the first camera, the second camera being operable to operatively communicate with the interrogator device through the first camera.

Also disclosed is a method of capturing images of an enclosed space including positioning a interrogator device on a first surface of a surface proximate to a camera mounted to a second, opposing surface of the surface, charging an energy storage device in the camera through the surface, capturing an image of the enclosed space, and transferring the image to the interrogator device.

In addition to one or more of the features described above or below, or as an alternative, further embodiments could include discharging the energy storage device.

In addition to one or more of the features described above or below, or as an alternative, further embodiments could include wherein discharging the energy storage device includes activating a flash device on the camera.

In addition to one or more of the features described above or below, or as an alternative, further embodiments could include wherein capturing the image includes activating one or more flash devices on the camera.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
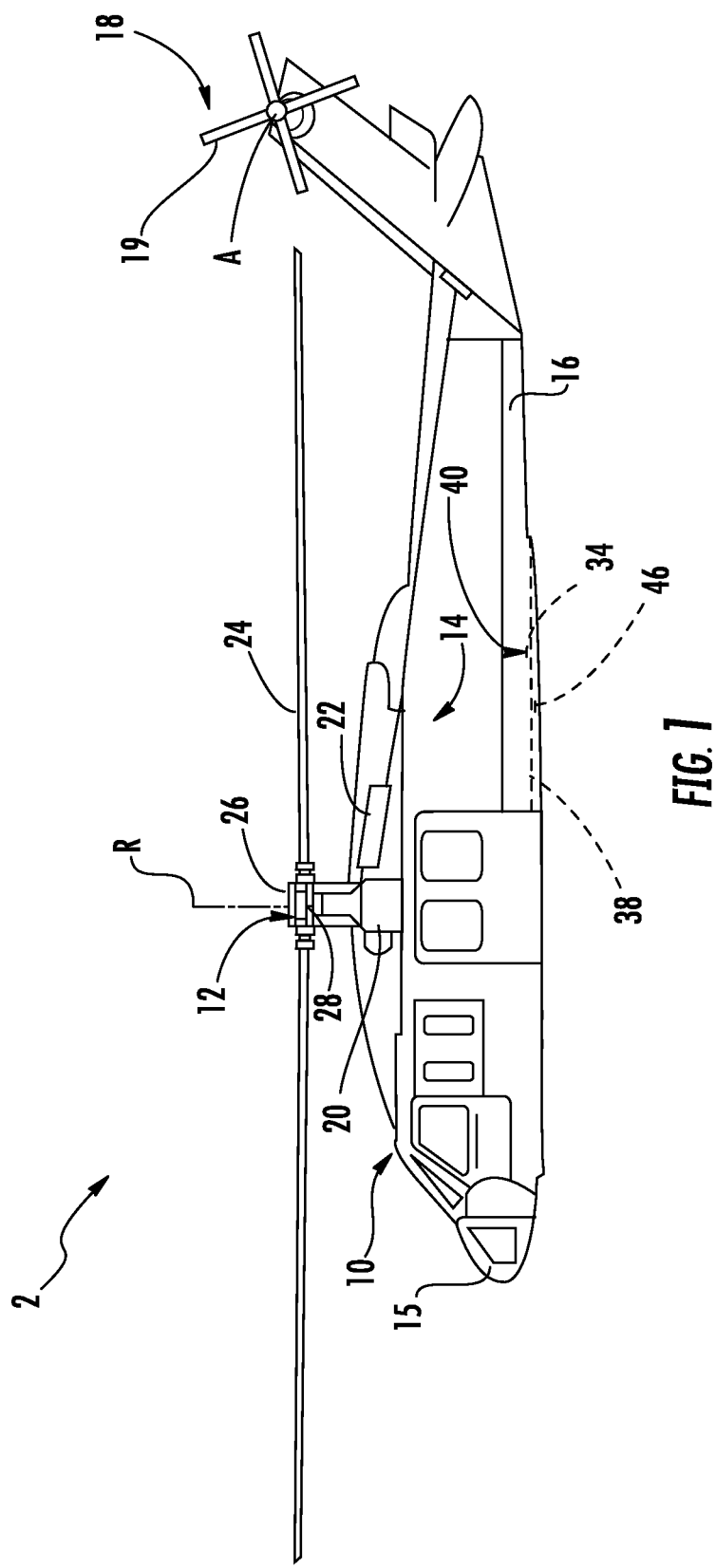
FIG. 1 depicts a side view of a vehicle, shown in the form of a rotary wing aircraft, including an integrated inspection system having a wireless, battery-less camera for inspecting enclosed spaces, in accordance with an exemplary embodiment.

FIG. 1 schematically illustrates a vehicle 2 depicted as a rotary wing aircraft 10 having a main rotor assembly 12. It is to be understood that vehicle 2 may take on a variety of forms. It is also to be understood, as will become more fully evident below, that exemplary embodiments may be incorporated into a wide range of systems and devices and need not be limited to vehicles. Aircraft 10 includes an airframe 14 having a nose 15 and an extending tail 16 which mounts a tail rotor system 18, such as an anti-torque system, a translational thrust system, a pusher propeller, a rotor propulsion system, and the like. Tail rotor system 18 includes a plurality of tail rotor blades 19 that rotate about a tail rotor axis "A". The main rotor assembly 12 is driven about a main rotor axis R through a gearbox (illustrated schematically at 20) by one or more engines 22. Main rotor axis R is substantially perpendicular to tail rotor axis A. Main rotor assembly 12 includes a plurality of rotor blades, one of which is indicated at 24, mounted to a rotor hub 26.

A swashplate 28 provides control movements to rotor blades 24. More specifically, swashplate 28 is activated to affect a state or orientation of the rotor blades 24. Although a particular helicopter configuration is illustrated and described in the disclosed embodiment, other configurations and/or machines, such as high speed compound rotary wing aircraft with supplemental translational thrust systems, dual contra-rotating, or co-rotating coaxial rotor system aircraft, turbo-props, tilt-rotors and tilt-wing aircraft, as well as ground vehicles, sea vehicles, enclosed containers and areas within industrial plants may also benefit from the exemplary embodiments described herein.

Rotary wing aircraft 10 includes a plurality of enclosed spaces, one of which is indicated at 34. It is to be understood that the term "enclosed space" describes an area that may be difficult to access and not necessarily an area that is fully enclosed by walls. Enclosed space 34 may be defined by one or more surfaces 38. It is also to be understood that the term "surface" may describe a wall defining, at least in part, the enclosed space or an article arranged within the enclosed space. Enclosed space 34 may represent an area of interest for periodic or spot inspection. Accessing enclosed space 34 requires the removal of one or more panels. Once enclosed space is inspected, the one or more panels require replacement. Removal of the one or more panels could have a negative impact on seal integrity, structural integrity, inspection time, or the like. Therefore, it would be desirable to visually inspect enclosed space 34 without actually physically accessing the area of interest.

In order to visually inspect enclosed space 34 without removing any panels, or otherwise physically accessing enclosed space 34, rotary wing aircraft 10 includes an integrated inspection system 40. Integrated inspection system 40 includes a camera 46 mounted to, for example, surface 38 within enclosed space 34. Camera 46 may be a wireless and a battery-less camera. It is to be understood that battery-less describes a lack of a long term or non-transient power supply and or a lack of electrolytic components. It is also to be understood that camera 46 may be provided in new vehicles and/or added after construction or manufacturing of the vehicles. It should be further understood that the camera could be integrated into surface 38. For example, a composite surface may include an integrated camera that forms part of integrated inspection system 40.

Figure 2:
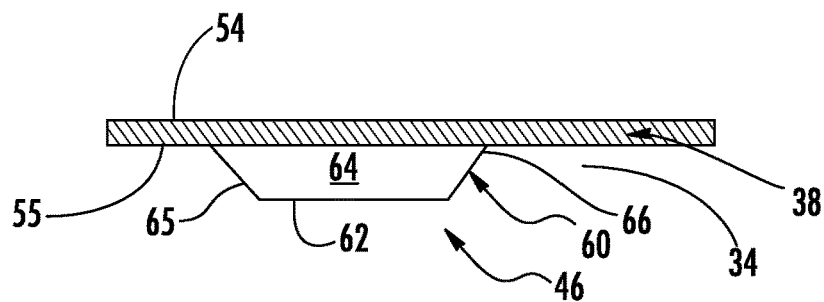
FIG. 2 depicts the integrated inspection system illustrating the wireless, battery-less camera mounted to a surface of an enclosed space in the vehicle of FIG. 1, in accordance with an exemplary embodiment.
Figure 3:
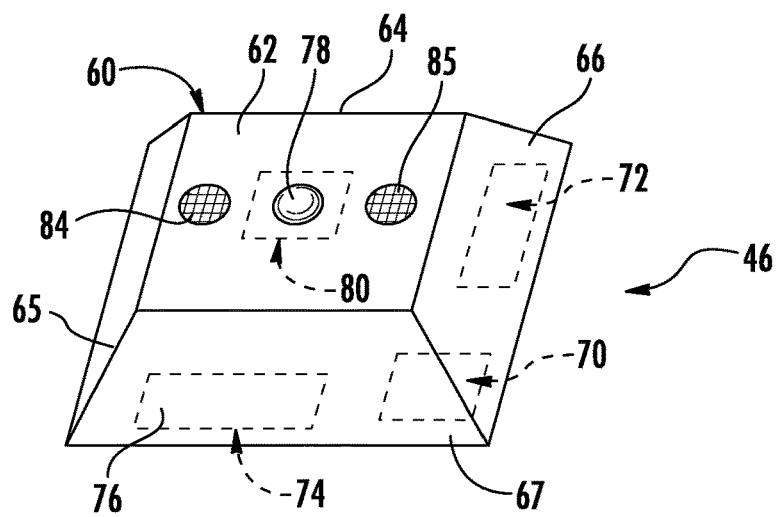
FIG. 3 depicts a partial perspective view of the wireless, battery-less camera of FIG. 2.

In accordance with an exemplary aspect illustrated in FIG. 2, surface 38 includes a first surface 54 and an opposing second surface 55 that defines, at least in part, enclosed space 34. Camera 46 includes a body 60 mounted to opposing second surface 55. Body 60 includes a first face 62, a second face 64, a third face 65, a fourth face 66 and a fifth face 67. It is to be understood that the number, location and orientation of faces on body 60 may vary. As shown in FIG. 3, body 60 houses a circuit assembly 70 that may be operatively coupled to and/or include a memory device 72 and an optional energy storage device 74. Energy storage device 74 may take the form of a transient energy storage device such as a capacitor 76. It is to be understood that camera 46 may be sensitive to a broad spectrum of emitted light or to only a desired wavelength or spectrum, such as, for example, Ultra Violet (UV) or Infra-Red (IR). It is also to be understood that camera 46 may be devoid of energy storage and thus receive energy from another device.

First face 62 includes a lens 78 operatively coupled to a camera device 80. Camera device 80 is operable to capture images of enclosed space 34. Captured images are stored in memory device 72 until transferred as will be detailed more fully below. Camera 46 may also include a first flash device 84 and a second flash device 85 mounted to first face 62, adjacent lens 78. First and second flash device 84 and 85 may take the form of light emitting diodes (LEDs) (not separately labeled) or other light sources having a desired wavelength or spectrum of emitted light. That is, the wavelength of first flash device 84 and second flash device 85 may vary depending upon desired inspection criteria. First and second flash devices 84 and 85 are selectively activated to illuminate enclosed space 34 prior to capturing the image(s). Additionally, it is to be understood that lens 78 may also be selected to enhance insight into structural stress concentrations, corrosion, and/or cracks. Lens 78 may also be selectively adjustable.

Figure 4:
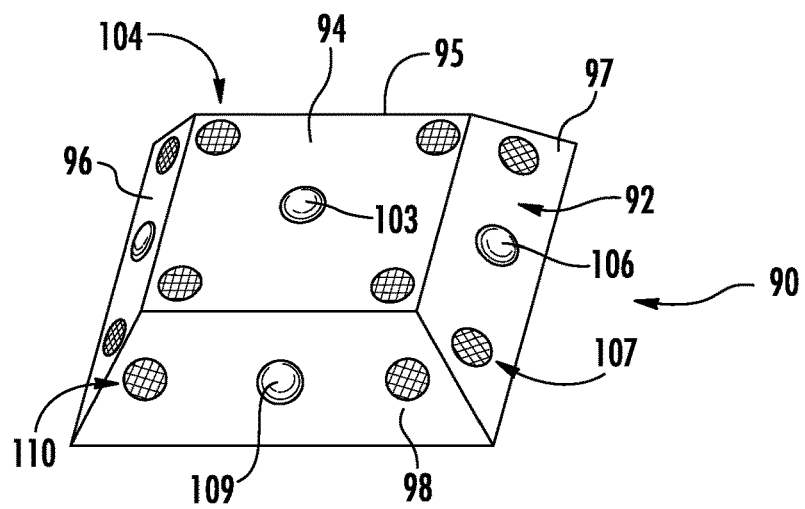
FIG. 4 depicts a partial perspective view of a wireless, battery-less camera for inspecting enclosed spaces, in accordance with another aspect of an exemplary embodiment.

Reference will now follow to FIG. 4 in describing a camera 90 in accordance with another aspect of an exemplary embodiment. It is to be understood that camera 90 may include similar internal devices as described above with respect to camera 46. Camera 90 includes a body 92 having a first face 94, a second face 95, a third face 96, a fourth face 97 and a fifth face 98. Faces 95-98 extend at an angle relative to first face 94. Faces 95-98 are also disposed at an angle relative to one another. First face 94 includes a first lens 103 and a first plurality of flash devices 104. Fourth face 97 includes a fourth lens 106 and a fourth plurality of flash devices 107. Fifth face 98 includes a fifth lens 109 and a fifth plurality of flash devices 110. It is to be understood that second face 95 and third face 96 may also include corresponding second and third lenses (not separately labeled) and second and third pluralities of flash devices (also not separately labeled). Each lens may include a corresponding camera device (not shown) that may be independently operated to capture multiple images of enclosed space 34. Additionally, it is to be understood that each camera device may include a selectively adjustable lens.

Figure 5:
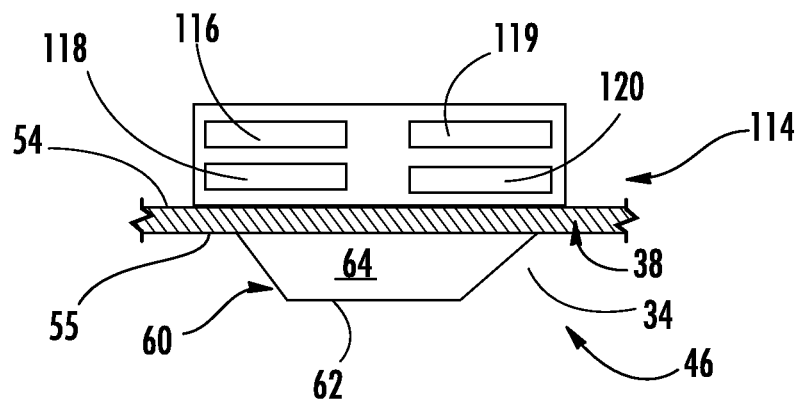
FIG. 5 depicts a schematic view of the integrated inspection system illustrating the wireless, battery-less camera mounted to a surface of a surface and a interrogator device arranged at an opposing surface of the surface.

Integrated inspection system 40 also includes an interrogator device 114 that may be selectively positionable on first surface 54 of surface 38, opposite camera 46 as shown in FIG. 5. Interrogator device 114 may include a circuit assembly 116 operatively associated with and/or including a charging controller 118, a transfer controller 119 and a memory unit 120. It is to be understood that while shown as a single component, interrogator device 114 may be made up of multiple separate cooperating components. As will be detailed more fully below, interrogator device 114 charges energy storage device 74 and activates camera 46 to capture an image of enclosed space 34. A captured image is then transferred to memory unit 120 in interrogator device 114. That is, images are captured of, and transferred from enclosed space 34 through surface 38. In this manner, enclosed space 34 may be visually inspected without the need for actual physical access. It is to be understood that in lieu of charging energy storage device 74, interrogator device 114 may provide primary power to camera 46. That is, camera 46 may derive all power from interrogator device 114.

Figure 6:
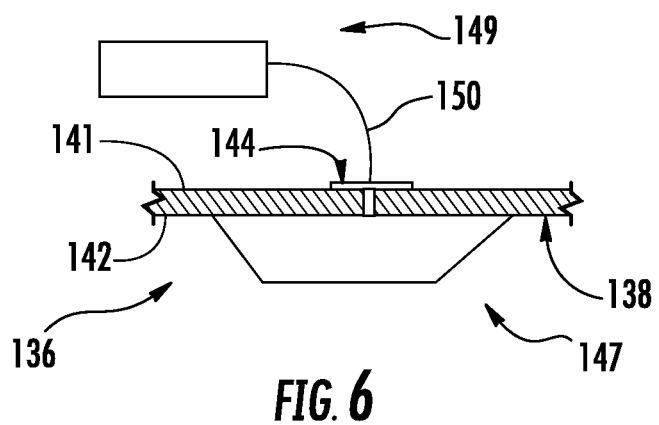
FIG. 6 depicts a partial cross-sectional side view of an integrated inspection system having a wireless, battery-less camera in accordance with another aspect of an exemplary embodiment.

In addition to a wireless transfer through surface 38, an integrated inspection system 136 including a wired transfer is also contemplated. A surface 138, depicted in FIG. 6, includes a first surface 141 and an opposing second surface 142. A communication port 144 extends through surface 138. A camera 147 is mounted to opposing second surface 142 across communication port 144. An interrogator device 149 may be selectively connected to camera 147 through a cable 150. It is to be understood that interrogator device 149 may be connectable to more than one camera at a time.

Figure 7:
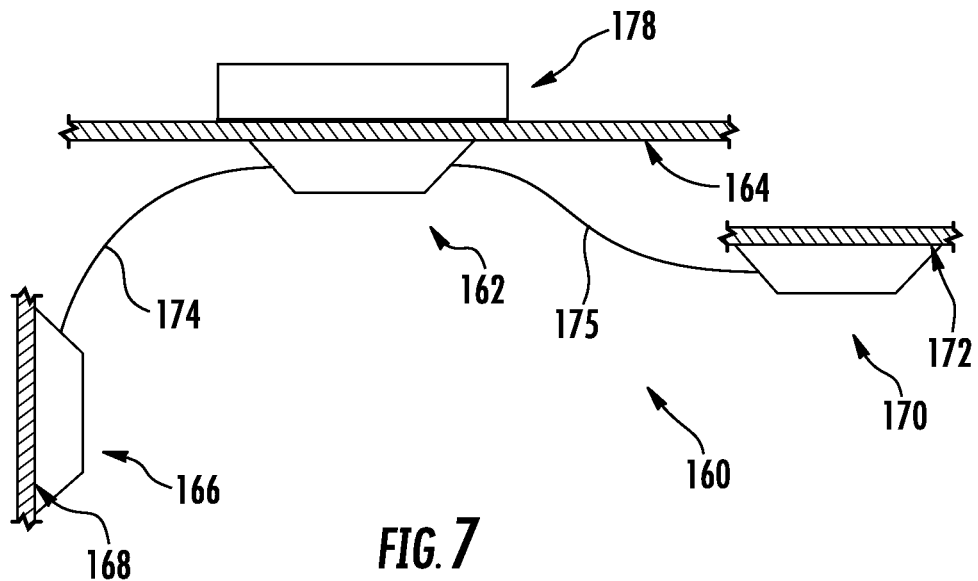
FIG. 7 depicts a partial cross-sectional side view of an integrated inspection system having a wireless, battery-less camera operatively coupled to additional wireless, battery-less cameras, in accordance with another aspect of an exemplary embodiment.

Reference will now follow to FIG. 7 in describing an integrated inspection system 160 in accordance with another aspect of an exemplary embodiment. Integrated inspection system 160 includes a main node 162 which may define a first camera mounted to a first surface portion 164, a second camera 166 mounted to a second surface portion 168 and a third camera 170 mounted to a third surface portion 172. First, second and third surface portions 164, 168 and 172 may represent different areas of a single surface or may represent different surfaces within an enclosed space (not separately labeled). First camera 162 may be operatively connected to second camera 166 through a first conductor 174. First camera 162 may also be coupled to third camera 170 through a second conductor 175.

In this arrangement, main node 162 may define a primary device and second and third cameras define secondary devices. Second and third cameras 166, and 170 capture images of an enclosed space. The images may then be passed to an interrogator device 178 through main node 162. Similarly, charging energy may be passed from interrogator device 178 to second and third cameras 166 and 170 through main node 162. In accordance with an exemplary aspect, each camera 166, and 170 and associated flashes (not shown) may be activated simultaneously or according to a predefined sequence. Further, each camera 166, 170 may possess a flash having a different wavelength and a camera system sensitive to that wave length or to a wavelength another of cameras 166, 170. Further, as noted above, main node 162 may possess an additional camera(s) and the number and location of cameras may vary.

Figure 8:
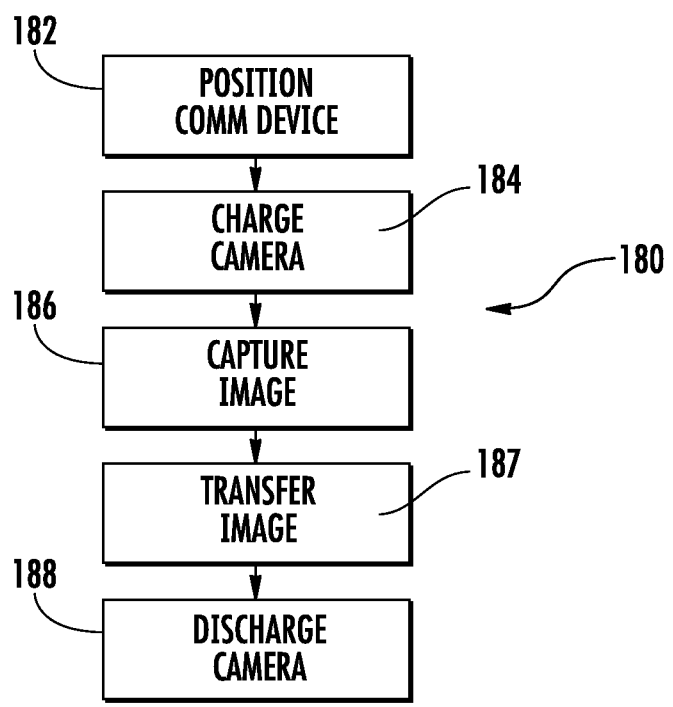
FIG. 8 depicts a flow chart illustrating a method of visually inspecting an enclosed space without the need for physical access, in accordance with an aspect of an exemplary embodiment.

Reference will now follow to FIG. 8 in describing a method 180 of visually inspecting an enclosed space without the need for physical access in accordance with an aspect of an exemplary embodiment. In block 182, interrogator device 114 is positioned on first surface 54 of surface 38 across from camera 46. In block 184, interrogator device 114 charges energy storage device 74 through surface 38. In accordance with an aspect of an exemplary embodiment, interrogator device 114 may charge energy storage device 74 wirelessly. In accordance with another aspect of an exemplary embodiment, interrogator device 149 my charge energy storage device 74 through cable 150. It should be understood that interrogator device 114 may provide any necessary power through cable 150.

In block 186 an image is captured of enclosed space 34 through camera 46. In block 187 the image is transferred to memory 120 in interrogator device 114. The image may be viewed at interrogator device 114 or may be uploaded to another system for analysis. In block 188 energy storage device 74 may be discharged in order to eliminate any residual charge. For example, first and second flash devices 84 and 85 may be operated until any residual charge in energy storage device is gone. In this manner, integrated inspection system 40 may be incorporated into spaces having volatile environments such as enclosed areas that are exposed to combustible fluids or any other environment where there are requirements that preclude devices having stored energy. Alternatively, in environments in which stored energy is not a concern, a residual charge may remain in order to enhance operational speeds.

It is to be understood that exemplary embodiments describe an integrated inspection system 40 that may provide images of enclosed spaces without the need for physical access to those spaces. Thus, inspection time, manpower, and repair costs can be reduced. Further, by eliminating the need for physical access, the likelihood of a poor repair to an enclosed space is also eliminated. It is also to be understood that that integrated inspection system 40 may employ a wide variety of cameras and flash devices capturing both standard images, IR images, and the like. It is also to be understood that the interrogator device may be large enough to surround all or a portion of the article having the enclosed area that is difficult to access. For example, the interrogator device may take the form of a hangar or a device arranged in a hanger that can surround a vehicle. As such, each camera or main node connected to various cameras may include one or more antennas or coils that can wirelessly receive power from the interrogator device and wirelessly transmit captured images to an image receiver that may or may not be part of the interrogator device.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An integrated inspection system comprising:
   at least one surface having a first side and a second side, the second side, defining, at least in part, an enclosed space;
   at least two cameras directly mounted in the enclosed space to the second side of the at least one surface, the at least two cameras being arranged to capture images of the enclosed space; and
   an interrogator device arranged external to the enclosed space and provided on and in contact with the first side of the at least one surface, the interrogator device being selectively operatively coupled to the at least two cameras via a wireless connection through the at least one surface, the interrogator device providing power to and receiving images from the at least two cameras through the wireless connection.

2. The integrated inspection system according to claim 1, wherein each of the at least two cameras includes an energy storage device.

3. The integrated inspection system according to claim 2, wherein the energy storage device comprises a capacitor.

4. The integrated inspection system according to claim 2, wherein the interrogator device includes a charging controller operable to wirelessly charge the energy storage device.

5. The integrated inspection system according to claim 1, wherein each of the at least two cameras includes a memory device and the interrogator device includes a memory unit.

6. The integrated inspection system according to claim 5, wherein interrogator device includes a transfer controller operable to wirelessly transfer the images from the memory device of the at least two cameras to the memory unit of the interrogator device.

7. The integrated inspection system according to claim 1, wherein the at least one of the at least two cameras includes at least one flash device.

8. The integrated inspection system according to claim 1, wherein each of the at least two cameras includes a first face and a second face extending at an angle relative to the first face, the first face including at least one first lens and the second face including at least one second lens, the camera being operable to capture a first image of the enclosed space through the at least one first lens and a second image of the enclosed space through the at least one second lens.

9. The integrated inspection system according to claim 8, wherein the first face includes at least one first flash device and the second face includes at least one second flash device.

10. The integrated inspection system according to claim 1, wherein the at least two cameras include a first camera and a second camera operatively connected to the first camera, the second camera being operable to operatively communicate with the interrogator device through the first camera.

11. A method of capturing images of an enclosed space defined by at least one surface having a first side and a second, opposing side, the second, opposing side defining, at least in part, the enclosed space comprising:
    selectively positioning an interrogator device in contact with the first side of the at least one surface external to the enclosed space proximate to at least two cameras directly mounted to the second, opposing side of the at least one surface;
    wirelessly charging an energy storage device in the at least two cameras through the at least one surface;
    capturing an image of the enclosed space; and
    wirelessly transferring the image to the interrogator device through the at least one surface.

12. The method of claim 11, further comprising: discharging the energy storage device.

13. The method of claim 12, wherein discharging the energy storage device includes activating a flash device on the at least two cameras.

14. The method of claim 11, wherein capturing the image includes activating one or more flash devices on the at least two cameras.

* * * * *